3 Sheets—Sheet 1.

C. W. SIEMENS.

REGENERATIVE GAS FURNACE.

No. 9,907. Reissued Oct. 25, 1881.

Witnesses
Saml R Turner
H J Martin

Inventor
Chas W Siemens
by C S Whitman
Att'y.

C. W. SIEMENS. 3 Sheets—Sheet 2.

REGENERATIVE GAS FURNACE.

No. 9,907. Reissued Oct. 25, 1881.

Witnesses
Saml R Turner
H. J. Martin

Inventor
Chas. W. Siemens
by C. S. Whitman
Att'y.

C. W. SIEMENS.
3 Sheets—Sheet 3.
REGENERATIVE GAS FURNACE.
No. 9,907.
Reissued Oct. 25, 1881.
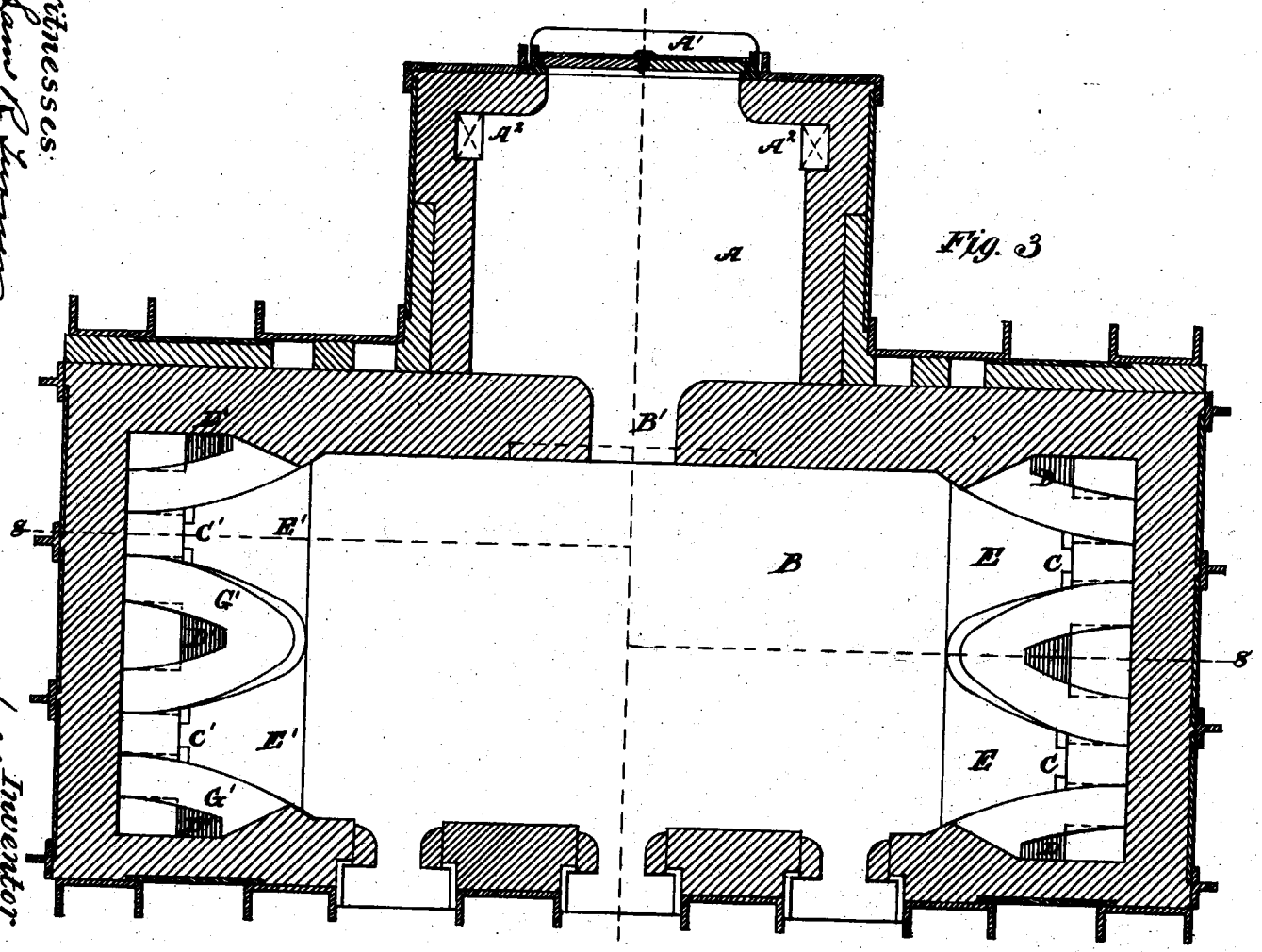
Witnesses:
Lam R. Turner
H. J. Martin
Inventor
Chas. W. Siemens
by C. Wheldman
Att'y.

UNITED STATES PATENT OFFICE.

CHARLES WILLIAM SIEMENS, OF WESTMINSTER, COUNTY OF MIDDLESEX, ENGLAND.

REGENERATIVE GAS-FURNACE.

SPECIFICATION forming part of Reissued Letters Patent No. 9,907, dated October 25, 1881.

Original No. 113,584, dated April 11, 1871. Application for reissue filed December 1, 1880.

DIVISION A.

*To all whom it may concern:*

Be it known that I, CHARLES WILLIAM SIEMENS, of Westminster, in the county of Middlesex, England, have made a new and useful invention having reference to Regenerative Gas-Furnaces, of which the following is a specification.

My invention relates to that class of furnaces for which Letters Patent of the United States numbered 89,441 were granted to me April 27, 1869; and the nature thereof consists in certain modifications in the construction of the same, whereby the air is made to issue into the furnace in diverse directions above the combustible gas, the gas is deflected horizontally into the furnace, the gas and air become thoroughly intermixed, the air is prevented from coming into contact with the metal or other substance on the bed of the furnace, the gaseous products of combustion are made to circulate through a charging-chamber, and other advantages are obtained, as hereinafter described.

Figure 1:
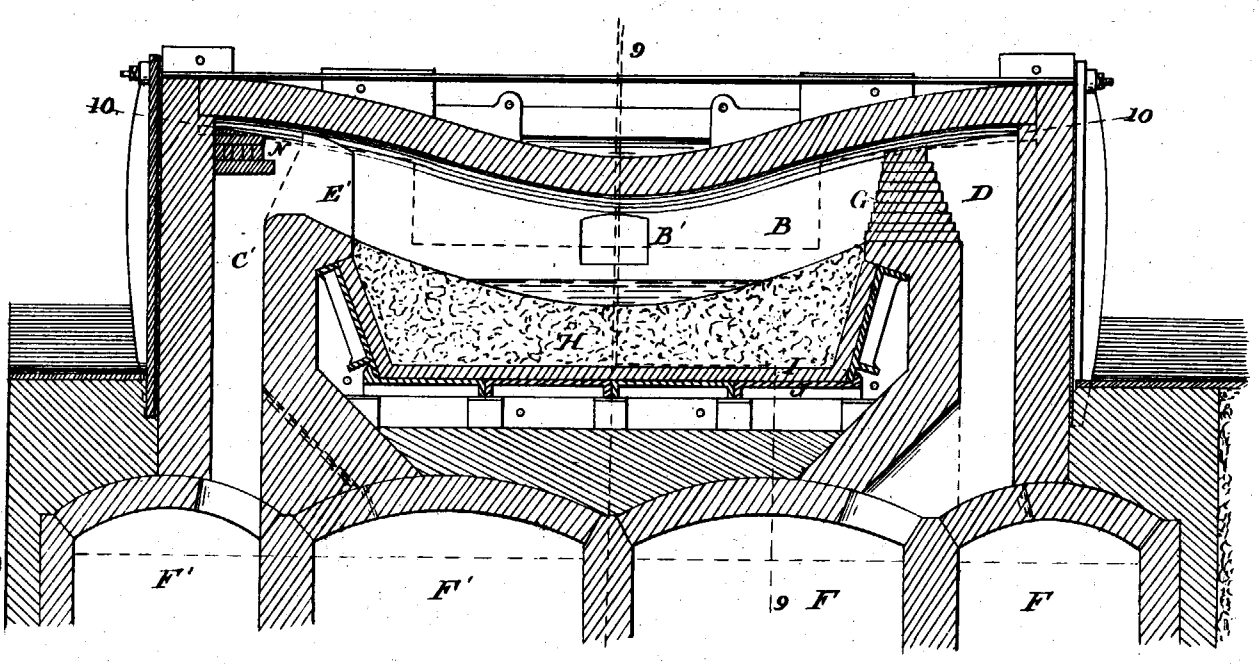
Figure 2:
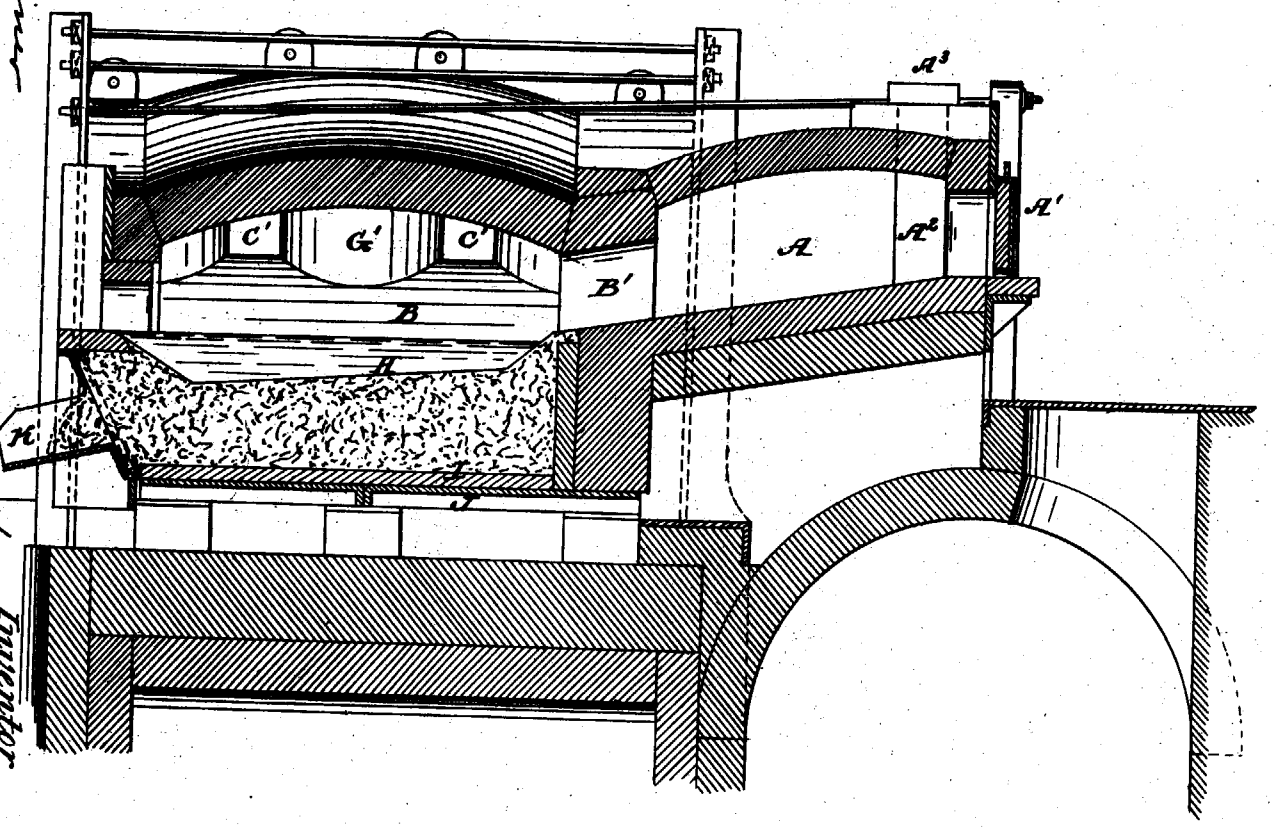

In the accompanying plate of drawings, in which corresponding parts are designated by similar letters, Figure 1 is a longitudinal section of the furnace on the line 8 8 of Fig. 3. Fig. 2 is a transverse section on the line 9 9 of Fig. 1, and Fig. 3 shows a sectional plan on the line 10 10 of Fig. 1.

In a furnace constructed according to my present invention the general arrangement of the regenerators is similar to that shown in the above-mentioned Letters Patent—that is to say, the four regenerators F F F′ F′ are arranged in pairs and vary in size, the smaller being for the passage of the gas and the larger for that of air, their proportions being in the ratio corresponding to the quantities of gas and air required to facilitate complete combustion in the heating-chamber. The regenerator-walls are built of fire-brick or other refractory material, and are made gas-tight, so that no leakage may take place from one chamber to the other. The regenerative chambers F F F′ F′ are filled with fire-brick stacked loosely together, and communicate by means of flues or passages with the furnace B in such a manner that the air enters the furnace above the gas, and by its superior specific gravity at equal temperatures tends to sink through the gas and intermix therewith. The gas flues or passages C C′ communicating between the gas-regenerators and the furnace are separated from the air flues or passages D D′ communicating with the air-regenerators and the furnace by a series of partition-walls.

One of the principal advantages of my present invention over those which have been heretofore patented consists in the peculiar construction of the combustible gas and air passages C D C′ D′ for effecting the mixture of the heated combustible gases and air rising from the regenerators F F F′ F′. The air-passages D D′ are raised very nearly to the roof of the furnace, while the gas-passages C C′ open into the chamber B at a considerably lower point, as shown at Fig. 1, and the side walls, G G′, of the air-flues are brought forward toward the chamber B in a converging manner until they meet, as shown in Fig. 3, thus forming widening passages E E′ for the gas to issue through.

Another highly important part of my present invention consists in deflecting and directing the ascending gases by means of slabs N, fixed over the vertical passages C C′, and causing them to enter into the furnace in a horizontal direction under the heated air, thus preventing the latter from coming into immediate contact with the contents of the furnace.

Another modification in the details of the construction of regenerative furnaces shown in my present invention consists in the enlargement or expansion of the upper ends of the air-passages, whereby the air is deflected toward the heating-chamber and flows into it in an inclined direction.

Another feature of my invention consists in the addition to the furnace of a heating-chamber, A, which may be used for the reception of ore before introducing it into the melting-chamber. The substance to be treated in this chamber may be introduced through the door A′, and then heated to the requisite degree by the radiated heat, or by flame from the furnace, a portion of such flame or hot gases being caused to enter the chamber A through the aperture B′, and to circulate through the same by means of the chimneys $A^2$, the tops of which are provided with slabs $A^3$ for regulating the draft.

The operation of the furnace is as follows: The waste gases from the furnace B are drawn down through one pair of regenerators, F′ F′, and heat the upper row of bricks to a temperature little short of that of the furnace itself. They then pass over cooler surfaces, and escape at length to the chimney-flue nearly cold. The current of hot gases is drawn downward through this pair until a considerable depth of brick-work near the top is uniformly heated to a temperature nearly equal to that of the entering gas, the heat of the lower portion decreasing gradually downward at a rate depending on the velocity of the current and the size and arrangement of the bricks. The direction of the draft is then reversed, the current of the waste gases is employed to heat the second pair of regenerators, F F, and the gas and air entering the furnace are passed in the opposite direction through the first pair of regenerators, F′ F′, and coming into contact, in the first instance, with the cooler brick-work below are gradually heated as they ascend, until at some distance from the top they attain a temperature nearly equal to the initial heat of the waste gases, and passing up into the furnace through the flues C′ and B′ meet and at once ignite, producing a strong flame. The air enters the furnace in diverse or divergent directions above the gas, and by reason of its superior specific gravity tends to sink through it, while the gases are deflected in a horizontal direction into the widening passages E′ by the slabs N, fixed over the vertical passages C′, so that the air and gases become thoroughly intermixed and complete combustion is effected, while any uncombined air remaining at the roof of the furnace is prevented from coming into contact with the metal or other substance on the bed of the furnace. The flame, after passing through the furnace, is drawn down to heat the regenerators F F, and thence passes to the chimney-flue.

Having thus described my invention, I claim and desire to secure by Letters Patent of the United States—

1. A regenerative furnace provided with air-flues of gradually increasing width, for the purpose of expanding and deflecting the air as it enters the furnace, substantially as described.

2. A regenerative furnace provided with gas-passages of increasing width, separated from the air-passages by converging partition-walls, as and for the purposes described.

3. A regenerative furnace in which the air-flues are separated from the gas-flues by partition-walls provided with deflectors fixed over the gas-passages, as and for the purposes described.

4. A regenerative furnace provided with gas-passages of increasing width and slabs N, as and for the purposes described.

5. A regenerative furnace provided with horizontal gas-passages of increasing width and vertical air-passages of increasing width, as and for the purposes described.

6. A regenerative furnace provided with vertical air-ports rising nearly to the roof of the furnace, and side walls for the flues extending forward in a convergent manner until they meet, in order that the air may issue into the furnace in diverse directions above the combustible gases, substantially as described.

7. The combination, with a regenerative furnace and its flues, of a supplemental chamber connected therewith provided with chimneys, as and for the purposes described.

C. WILLIAM SIEMENS.

Witnesses:
CHAS. ROCHE,
ROBERT JOHN CROW.